TRACTOR CHAIN ASSEMBLY

Original Filed Aug. 17, 1938 2 Sheets-Sheet 1

INVENTOR.
HARRY LAW
BY Munn, Anderson & Lilly
ATTORNEYS.

TRACTOR CHAIN ASSEMBLY

Original Filed Aug. 17, 1938 2 Sheets-Sheet 2

INVENTOR.
HARRY LAW
BY Munn, Anderson & Liddy
ATTORNEYS.

Reissued Nov. 18, 1941

Re. 21,953

UNITED STATES PATENT OFFICE 21,953

TRACTOR CHAIN ASSEMBLY

Harry Law, Merced, Calif., assignor of forty per cent to James A. Law, Merced, Calif.

Original No. 2,206,966, dated July 9, 1940, Serial No. 225,315, August 17, 1938. Application for reissue July 5, 1941, Serial No. 401,301

17 Claims. (Cl. 305—4)

My invention relates to improvements in a tractor chain assembly, and it consists of the combinations, constructions and arrangements hereinafter described and claimed.

The conventional tractor vibrates and bumps along over the ground because the tractor chains are composed of flat links and these links lie tangent to the idler wheel contacting it and bump as they move off onto a level surface. The pin centers of the tractor links are disposed out beyond the arcs of the idler wheels. The rear drive sprockets ride along on the pins with a resulting bumping action. Several methods have been resorted to for lessening this condition and one method has been to drop the rollers on the frame slightly lower than the lower portion of the drive sprocket and also a greater distance below the lower portion of the large idler wheel in front. Another method is to shorten the links and increase their number. These two methods serve to lessen vibration, but since the basic principle is still incorrect, there is a bumping action and a high speed movement of the tractor is impossible for this very reason.

The principal object of my invention is to cause link pins on an endless chain to continually follow an endless course laid out where the course has straight portions and inwardly curved portions lying tangent thereto and merging therewith, or where the course is entirely composed of inwardly curved tangent portions. One principal advantage of keeping the link pins continuously on a definite course is to prevent the links from bumping as they change their direction of movement along the course, and another advantage is to continuously maintain an even tension on the chain at all times, this second advantage resulting from the fact that the link pins never deviate from their predetermined course. The link pin has the most important function of any unit in a crawler track because it is essential to first provide a smooth movement of the link pins in order to obtain a smooth operation of the track or a chain.

The means for causing the link pins on an endless chain to continually follow a particular endless course consists of rollers mounted on the links and riding on an endless rail of a certain shape. The manner of determining the particular shape of the endless rail will be explained in detail in the description. Suffice it to say that the shape of the rail is plotted directly from this particular endless course by means of a link and when the rail shape is once laid out, the endless chain or track consisting of the links and rollers can be placed therearound and will ride on the rail when moved to cause the links to continuously hold the link pins on the predetermined course. The coordinating action of the links will cooperate with the rollers and rail to always keep the link pins on their true course. Thus any bumping action between any two links is obviated.

The endless chain may function as a movable sled runner for a vehicle where no power is applied to the chain or it may be driven by means of a sprocket, a cage pinion drive, or the like. When the endless chain has two parallel straight line portions, a chain spreader may be used to take up slack in the parallel straight portions of the chain without in any way altering the direction of the link pin travel. The straight portions of the rails have expansion joints with overlapping portions for providing a continuous supporting rail at the joints. The curved ends of the rail are moved farther apart when taking up the slack in the chain.

It is possible to provide an endless track with only a drive sprocket at the rear end of the track and to dispense with either a wheel or an additional sprocket at the front end of the track. It is further possible to place the rollers at any position between the ends of each link so long as the centers of the rollers lie within the endless course line defined by the link pin centers. I have found the best results when placing the roller in a position where a line from the roller axis to one of the two pin axes will make an acute angle with a line extending through the two pin axes, the angle being formed on the inner face of the link. It is possible, however, to place the roller axis equidistant from the two pin axes in the same link or to place the roller axis in a position where it will form a right angle with the two pin axes or an abtuse angle.

Other objects and advantages will appear in the following specification, and the novel features of the device will be particularly pointed out in the appended claims.

My invention is illustrated in the accompanying drawings forming a part of this application, in which.

Figure 2:
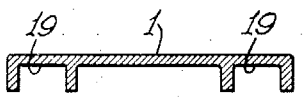
Figure 2 is a transverse section through the rail along the line 2—2 of Figure 1.

In carrying out my invention, I provide an endless track rail 1 which is channel-shaped as shown in Figure 2. The rail has a section 1a that is adjustable with respect to the section 1 and a spreader indicated generally at 2 is used for moving the section 1a the required distance away from the section 1 in order to tighten the tractor chain assembly. The heart of the invention lies in the particular manner of shaping the rail including the curved portions 3 and 4 of the rail so that the link pins will follow the endless course. This will be described more fully hereinafter.

Figure 4:
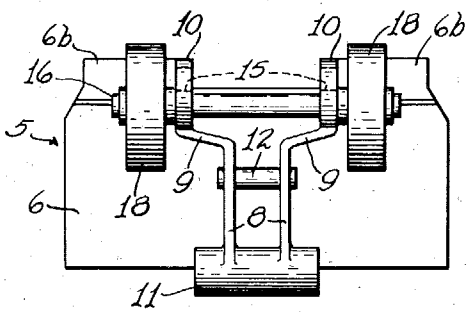
Figure 4 is a plan view of Figure 3.

A tractor chain is mounted around the rail and this chain comprises a plurality of links 5 pivoted together. Each link is of the shape shown in Figure 4 and it will be noted that the link 5 carries an integral shoe 6 with a ground-engaging lug 7 disposed at one end. Figure 4 shows flanges 8 integral with the inner face of the shoe and being bent at 9 for disposing ears 10 at the desired distance from each other. The flanges 8 support a bearing 11 at their other ends. A sprocket-engaging pin 12 is carried by the flanges.

The shoe 6 is cut away at 6a to receive the bearing 11 of the adjacent link and the two links are pivotally connected together by a link pin 13 that is passed through the opening 14 in the bearing and through aligned openings 15 in the ears. Any means for holding the pin 13 against longitudinal movement after the pin connects two adjacent links 5 together, may be used.

Each link carries a shaft 16 and this shaft is passed through aligned openings 17 also provided in the ears 10. Large rollers 18 are rotatably mounted on the ends of the shaft and these rollers ride in channel guides 19 formed in the rail, see Figure 2. A sprocket 20 is rotatably mounted in the section 1 at 21 and the rail 1 is slotted at 1b to receive the sprocket. The sprocket has six recesses 22, although I do not wish to be confined to the exact number shown. The recesses 22 are of a size to receive the sprocket pins 12 carried by the links.

The structure shown in Figures 1 to 4 inclusive, has been briefly described and I will now set forth how the exact shape of the endless rail 1 is determined. The endless line for the link pins 13 to follow is shown by the straight broken line portions 12a and the perfect circle portions 13a and 13b that are tangent with and thus merge into the straight portions 12a. A template (not shown) of the link 5 is made and this template has two link pin centers corresponding to the centers of the link pins 13, a sprocket pin center 12 disposed midway between the link pin centers, and a roller corresponding to the roller 18 with its center inside the pitch line. The template is placed on the perfect circle portion 13a so that the link pin centers coincide therewith. As the template is moved around the predetermined line, the link pin centers are held accurately and continually on the line. The path traced by the innermost peripheral point of the roller as the template is moved entirely around the predetermined endless line to the point of beginning, is the path that determines the exact shape of the endless rail. By "innermost peripheral point," I mean such a point as related to the endless line formed by the track pitch line which is the farthest point of the roller periphery inward from the endless line. The sprocket pin center on the template will also describe a fixed course that it will always follow.

Care is taken as the template enters and leaves the curved portion 13a that the link pin centers accurately follow the straight line portions 12a that lie tangent with and thus merge into the curved portion. When this is done, the innermost roller periphery will describe the rail curve 3, which in actual practice will have three distinct portions, a compound curve portion extending between the points 3a and 3b as the link pin centers move from the lower straight pitch line 12a onto the perfect circle portion 13a (see Figure 1), a perfect circle portion lying between the points 3b and 3c, caused by both link pin centers being retained on the perfect circle portion 13a and following this portion, and another compound curve portion lying between the points 3c and 3d, and formed as the link pin centers move from the perfect circle portion 13a onto the upper straight pitch line 12a. As the link pin centers follow along the upper straight line portion 12a, the inner periphery of the roller 18 will describe a corresponding straight rail portion that is parallel therewith.

At the other perfect circle portion 13b of the endless course, the link pin centers when moving from the upper straight line portion onto the curved portion, will cause the innermost periphery of the roller to describe the rail curve 4. The curve 4 in actual practice also has three distinct portions, a compound curve portion extending between the points 4a and 4b caused by the link pin centers moving from the upper straight pitch line 12a onto the perfect circle portion 13b, a perfect circle portion lying between the points 4b and 4c and caused by both link pin centers being retained on the perfect circle portion 13b and following this portion, and another compound curve portion lying between the points 4c and 4d, and formed as the link pin centers move from the perfect circle portion 13b onto the lower straight pitch line 12a. As the link pin centers follow along the lower straight line portion 12a to the point of beginning, the inner periphery of the roller 18 will describe a straight rail portion 4d to 3a that is parallel therewith. The rail shape in Figure 1 will therefore have the following portions: straight line lower portion 4d to 3a; compound curve 3a to 3b; perfect circle portion 3b to 3c; compound curve 3c to 3d; upper straight line portion 3d to 4a; compound curve 4a to 4b; perfect circle portion 4b to 4c; and compound curve 4c to 4d, which brings one back to the point of beginning. Inasmuch as the roller is located near the end of the link, the four compound curves of the endless rail are not all similar, but are alternately similar, i. e., the curves 3a—3b and 4a—4b are similar, and the curves 3c—3d and 4c—4d are similar to each other.

Since the exact shape of the rail 1 is determined by the path made by the innermost portion of the roller 18 as the link pin centers follow the endless predetermined path, it follows that when the endless chain or track is mounted on the rail, the coordinated action of the links 5 with the rollers 18 will cause the link pins 13 to follow the same endless path originally laid out. Thus by controlling the action of the link pins, I prevent all bumping between the sprocket engaging pins and the sprocket and between the links and the ground. While the compound curved rail portion 3a—3b will cause the rollers 18 to lead the link pins 13 from the lower straight portion 12a onto the perfect circle portion 13a, the sprocket pins 12 will be caused to follow the compound curve 12b that is tangent to the lower straight portion 12a and also tangent to the pitch diameter 22a of the sprocket. The compound rail curve portion 3c—3d will likewise cause the rollers 18 to lead the link pins 13 from the perfect circle portion 13a onto the upper straight portion 12a, and the sprocket pins 12 will be caused to follow the compound curve 12c that is tangent to the sprocket pitch diameter 22a and to the upper straight portion 12a. In this way, the sprocket pins 12 will move into and out of engagement with the sprocket 20 without any bumping action.

No sprocket is necessary at the curved rail portion 4. The compound rail curve portion 4a—4b will cause the pins 12 to follow the compound curve 12d and to merge into the perfect circle portion 22b without any bumping action as they enter this portion from the upper straight line 12a. The compound rail curve portion 4c—4d will cause the sprocket pins 12 to follow the compound curve 12e from the perfect circle portion 22b to the lower straight portion 12a without any bumping action. The perfect circle portions 13a and 13b may be termed the track pitch diameter. The centers of the rollers 18 lie inside of the straight pitch lines 12a, the sprocket pitch diameter 22a and the perfect circle portion 22b.

There will therefore, be no lost motion between the links as they pass from the top of the rail around the curved end 4 and onto the bottom of the rail. In fact, the device could be used as a sled, if desired, without sprockets at either end, the endless tread merely moving around over the track as the device is moved over the ground.

From the foregoing description of the various parts of the device, the operation thereof may be readily understood.

The spreader 2 is adjusted to cause the tractor chain to run snugly against the rail and it should be noted that the conventional type of endless tractor chain cannot stand such an adjustment. The chain will be moved around the rail by means of the sprocket and there will be an absolutely smooth operation with no bumping as the chain leaves the straight portions of the track and moves into the curved portions or vice versa. The rail is made in the form of a channel to guide the rollers and the lower rail is inverted so that it is impossible to become fouled with mud, snow, ice or the like. This type of the device is particularly adapted for use in snow where the conventional type of tractor fails terribly because my load carrying rail is inverted. The tractor chain may be repaired or adjustments made to the rollers by stopping the desired roller near the middle of the upper rail portion. A bar may be used for raising the track and inserting a block under it. A portion of the side of the track is left open for a foot or two as shown at 1c and this will permit the roller to be slipped off from its shaft, if desired. In repairing rollers on a conventional track, it is necessary to jack up the tractor.

Figure 1:
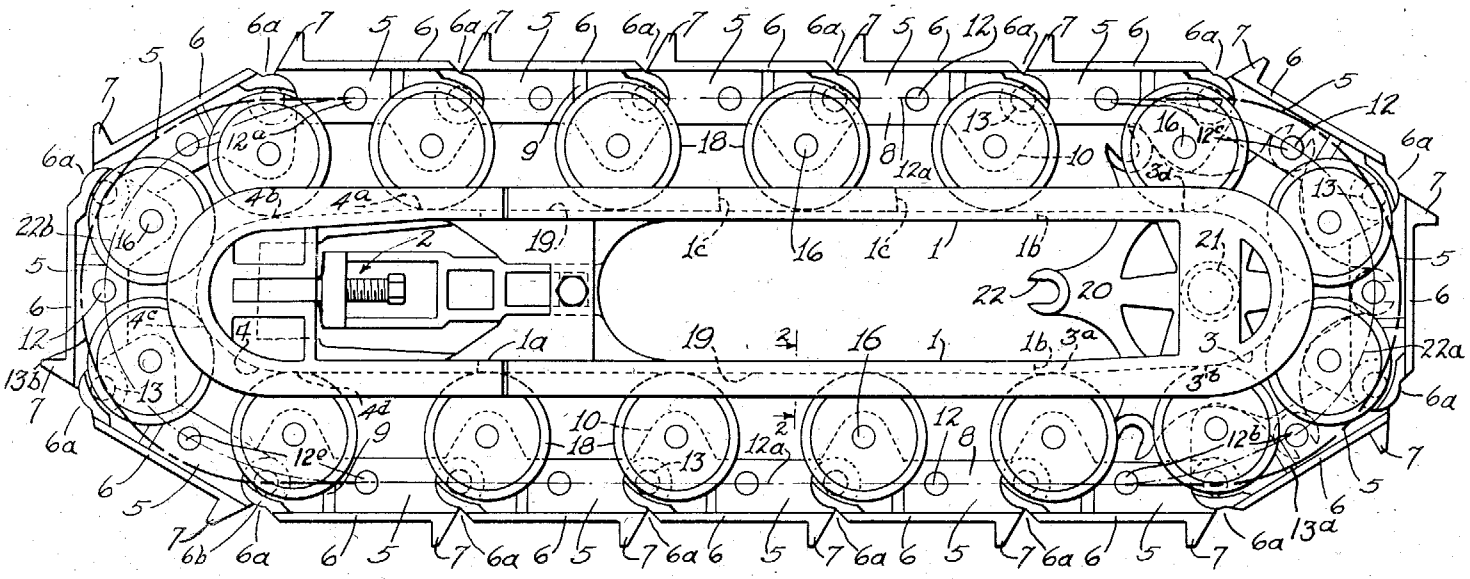
Figure 1 is a side elevation of the device.

Figure 1 shows the shoes 6 overlapping slightly and the opposed edge portions of two adjacent shoes are in the form of a V as shown at 6a in Figure 1. This V is never entirely closed even when the links are straightened out with respect to each other. This prevents rocks and other foreign matter from becoming jammed between the opposed edges of the links and yet the links fit snugly together to provide a continuous tread. The spaces between adjacent links do not act as "nut crackers" to foreign particles. It is possible to attain high speed without excessive injury to the track because the design is mechanically correct. The folding action of the rollers inwardly as they pass around the sprockets and around the other curved parts of the rail, tends to reduce centrifugal force developed at these points to a minimum. The links can be made from simple castings and very little coring is required. No special tooling is necessary and a minimum amount of machine work is needed in the manufacture of the device.

The tractor chain is applicable to a rhomboid shape or other shapes forming straight lines to any size curve up to a point where the curve becomes so small that the rims of the adjacent rollers contact or rub against each other. Small rollers permit a sharper and smaller curve to be made because they have more clearance when the track folds around the curve. Large rollers are smoother in operation and will sustain a greater load. The device makes use of more rollers than the conventional tractor chain and the rollers are under a load carrying strain for less than one-half their entire trip around the endless rail. The rollers on top and the rollers at the curved ends carry very little weight and this doubles the life of the rollers. It is possible to use a rail with long straight portions and about half as many links need be employed.

In Figure 1, I show the acute angle type of roller and link construction. This type has an advantage over the right-angle or obtuse angle design and also over the isosceles triangle design; i. e., where the roller is placed in the middle of the link. On the acute angle type, when the link is moving around the sprocket or the curved end 4, the roller axis lies on the same radius as extends through the pin 13. The rollers are therefore never in a cramped position as they would be when the right-angle or obtuse angle type of roller and link is used. Furthermore, when the device hits an obstruction head on, such as a big stump, the force of the blow is carried in a straight line directly to the center of the arc, of the curved end of the track. The curves 3 and 4 in the acute angle type do not have an outer bulge which is true in a curve designed for the right-angle or obtuse angle type. The acute angle device is therefore a superior arrangement.

Figure 5:
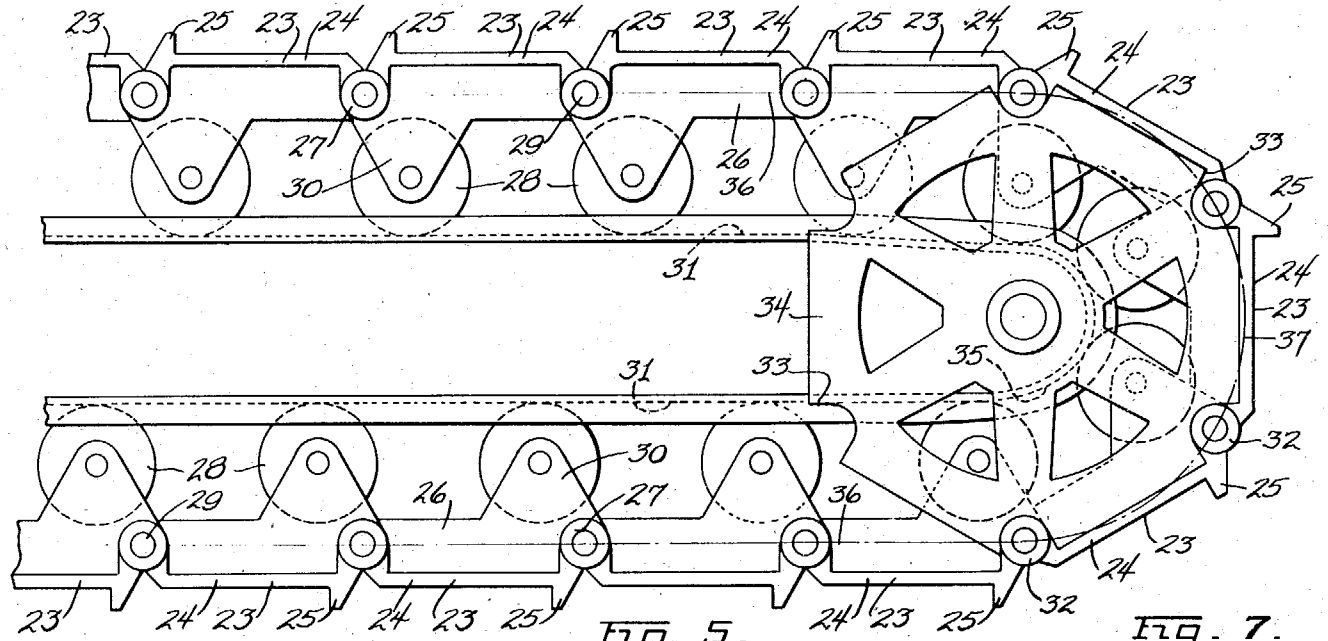
Figure 5 is a side elevation of a modified form of the invention.
Figure 6:
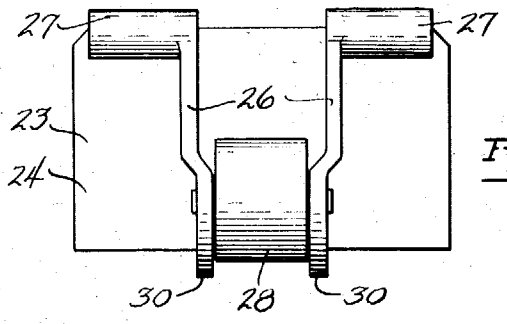
Figure 6 is a plan view of one of the links shown in Figure 5.

In Figure 5, I show a slightly modified form of the invention. In this form of the device, the acute angle type of roller and link is again shown, but the link pin also becomes the sprocket pin. One of the links 23 is illustrated on a larger scale in Figure 6 and this link has a shoe portion 24 with a lug 25. Integral flanges 26 carry bearing sleeves 27 and these flanges have ears at their other ends which rotatably carry a roller 28. Pins 29 are passed through the aligned bores of the sleeve bearings 27 and through aligned openings 30 in the ears. The rollers 28 ride on a channel track 31 and the pins 29 have enlarged bosses 32, see Figure 5, designed to be received in recesses 33 in a sprocket 34. One double sprocket is used in this form of the device and the recesses 33 receive the bosses 32 of the pins or the recesses may be made smaller to receive only the ends of the pins.

The curved end 35 of the track rail 31 is not a perfect circle, but is made in the same manner as the curved portions 3 and 4 of the track 1. A template is made of one of the links with its roller and then the template is moved along the predetermined course line 36—37 with the link pin centers following this endless line. The innermost periphery of the roller 28 charts the shape of the rail 31 including the curved portion 35 which is composed of two compound curve portions merging into the straight rail portions and having their other ends merging into the perfect circle portion. The curve (not shown) at the other end of the rail is made by moving the template in the manner already suggested. The rail will cause the rollers 28 to keep the link pins on the course line and this will obviate any bumping action as the link pins move onto or off from the sprocket. The rollers 28 have their centers disposed on the inside of the pitch line shown at 36 and also on the inside of the pitch diameter shown at 37. If desired, a double sprocket may be disposed at the other end of the form of the device shown in Figure 5 or it may be dispensed with in the same manner as shown in Figure 1. The operation of this form of the device is the same as that shown in Figure 1.

Figure 7:
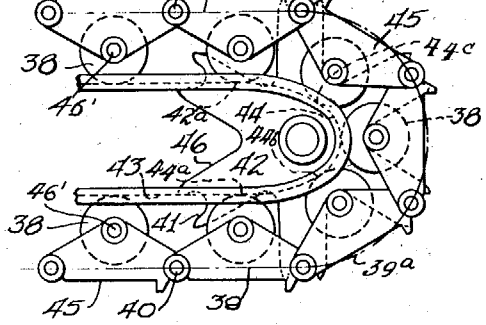
Figure 7 is a diagrammatic view of another form of the invention.

An isosceles triangle arrangement of links and rollers is shown in Figure 7. In this form, the link pins 40 also function as sprocket pins. Roller 38 has its center disposed inside of a pitch line 39 and equidistant from link pins 40. The pins 40 are received in recesses 41 in a sprocket 42. A channel rail 43 supports the rollers and the curved end 44 of this rail is made in the same manner as the curves 35 in the rail 31 and the curves 3 and 4 in the rail 1. For example, the curve 44 has a compound curved portion **44*a*—44*b* plotted by the innermost point on the roller periphery as the link pins move from the straight pitch line portion 39 onto the perfect circle portion 39*a*; a perfect circle portion 44*b*—44*c* plotted by the same roller point as the link pins follow the perfect circle 39*a*; and a second compound curve portion 44*c*—44*d* plotted by the roller periphery as the link pins move from the perfect circle portion 39*a* onto the upper pitch line 39. In the type of the device where the rollers are in the center of the link 45, as shown in Figure 7, the links will have a tendency to rock and a sprocket 42 will be necessary at the front of the device as well as at the back, and the spreader, not shown in Figure 7, will have to be kept fairly tight at all times. The sprocket 42 has deep recessed portions 46 between the recesses 41 to clear the roller axles 46'. The only way this form of the device differs from the other forms is that the compound curves are all similar and not alternately similar because the location of the roller 38 is equidistant from the link pins 40**.

In the form of the device shown in Figure 1, the sprocket engages with pins 12 that are not used for connecting the links. In the other two forms shown, the pins connecting the links together are also engaged by the sprockets. The right-angle and obtuse angle forms of links and rollers are not shown because their construction will be self-apparent. These forms would operate in the same manner as the forms illustrated. The curved portions of the tracks would be of a slightly different shape, but they would be designed in the same way as the curved portions 3, 4, 35, and 44.

In the standard tractor, the sprockets are placed in a position where their pitch diameters have their lower portions disposed above a pitch line drawn through the pin centers connecting the links that contact with the ground. This pitch line is therefore not tangent to the sprocket pitch diameter line. The links will therefore be lifted as they move from the ground to the sprocket and the leading pin in the link will be moved toward the pitch diameter.

If the movement of one link is followed from the ground to the sprocket, it will be noted that the leading link pin moves toward the pitch diameter line of the sprocket, being carried there by the preceding link. The leading pin in moving upwardly on the sprocket, will be carried above the lowermost portion of the pitch diameter line before the rear pin engages with a sprocket tooth. This tooth is moving downwardly and changes the direction of the rear pin from an upward one to a downward one. The main cause of the knocking or bumping of the tractor links is that two forces, i. e., the link pin and the sprocket tooth, are traveling to meet each other. With my new invention, each sprocket-engaging pin will follow from the straight pitch lines into the sprocket pitch diameter curved lines without any bumping action. Where the sprocket pins are separate from the link pins, as shown in Figure 1, the link pins will follow the track pitch diameter which is a perfect circle portion differing from the sprocket pitch diameter, but lying tangent to and merging wtih the straight pitch lines **12*a*. Figure 1 shows the sprocket pitch diameters at 22*a* and 22*b* and shows the track pitch diameters at 13*a* and 13*b***.

The present device does away with the standard idler for guiding the horizontal portions of the endless chain. In the standard device, the lower horizontal chain portion rides under the lower set of rollers and the tendency of each roller, when reaching the connecting pin between adjacent links, is to cause the links to swing downwardly at the points of roller pressure. This causes the free ends of the two links to move slightly toward each other and jerk against the links to which they are attached. The links are always badly worn over the connecting pins due to this unevenness of operation. Bumpiness of operation also results because the rollers bump onto the different planes represented by the various links as the rollers pass over them. Usually there are four or five of these bottom rollers beating away on the track and the same is true with the top rollers where the track is slack. My endless rail with rollers carried by each link obviates this disadvantage.

The pins 12 entering the recesses 22 in the sprocket 20 shown in Figure 1, move directly into the sprocket recesses and seat in the recesses. When the pins are seated in the recesses, the pulling strain is applied and after this is completed, the pin pulls substantially straight out. Power is applied only when the pins are fully seated and the pins do not rotate in the recesses since they do not connect the links together. The turning movement is in the connecting pins and not in the drive pins and there is no additional wear on these pins.

Figure 3:
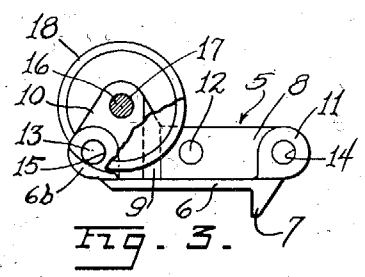
Figure 3 is a side elevation of one of the links, portions being broken away for clarity.

After a link is fully engaged with a sprocket, it is not necessary to provide a rail for this portion of its movement, although the rail will give added strength and smoother action. Each link 5 shown in Figures 1, 3 and 4, has guards or overlapping pans **6*b* which act as shields for the rollers 18** and prevent rocks, dirt, etc., entering between the links of the track layer. The guards are long enough to provide a closure between adjacent links even when the links swing into angular positions as they are carried around the sprockets. Figure 3 shows the guards 6b with an outer curve having a radius with the link pin axis 13 as a center and an inner curve having a radius with the roller pin axis 16 as a center.

While I have shown only the preferred forms of my invention, it should be understood that various changes or modifications may be made within the scope of the appended claims without departing from the spirit of the invention.

The traveling speed of the connecting pins 13 in Figure 1 is always the same regardless of whether the pins are moving along the straight portions of the track or around the curved portions. The traveling speed of the sprocket-engaging pins in Figure 1 varies. They gradually slow up as the link goes into the compound curve and increase their speed as they move out from the perfect circle portion.

I claim:

1. In combination, an endless track composed of a plurality of links pivoted together, a drive sprocket having pin-receiving recesses therein, the centers of the recesses lying in the pitch diameter of the sprocket, pins carried by the links and being receivable in the sprocket recesses, rollers carried by the links and their centers being disposed inside the pitch diameter when the links engage with the sprocket, an endless rail for the rollers, the rail having two straight portions and two curved portions, the portion encircling the sprocket axis being curved to support the rollers at all times to keep the sprocket engaging pins in the pitch diameter while the link is contacting with the sprocket, the other curved portion being similar in shape to the portion encircling the sprocket axis.

2. In combination, an endless track composed of links, pins pivotally connecting the links together, rollers carried by the inner faces of the links, an endless rail having curved end portions, a sprocket mounted at one of the end portions and designed to engage with the pins, the roller axes lying within the pitch diameter when their links are carried around the sprocket, the curved ends being shaped for guiding the rollers and causing the pins to follow the pitch diameter at the sprocket end and a curve of a similar diameter at the other end, the axes of the rollers lying in radii that extend through the pin axes when the links are on the sprocket.

3. In combination, an endless track composed of links, rollers carried by the links, pins connecting the links together, sprocket engaging pins mounted on the links equidistant between the link connecting pins, an endless rail having curved portions, a sprocket mounted at one of the curved portions and having recesses for receiving the sprocket pins passing around this portion, this curved portion being shaped for causing the rollers to move the links to cause the sprocket pins to follow the sprocket pitch diameter, the axes of the rollers lying inside the pitch diameter, the other curved portion being similar in shape to the curved portion associated with the sprocket, said rail having straight portions disposed at a distance from each other for causing the sprocket pins moving parallel with these portions to be at a greater distance from each other than the diameter of the sprocket.

4. In combination, an endless track composed of links, pins pivotally connecting the links together, means for causing the pins to follow an endless line consisting of straight portions and curved portions of perfect circles lying tangent to the straight portions, said means comprising an endless rail having straight portions and curved portions, rollers carried by the links and having their centers lying inside of the straight line portions and curved portions, said rollers riding on the rail, the shape of the rail being such as to cause the rollers and the coordinated action of the links to move the link pins continuously along the endless path defined by the straight and curved portions.

5. In combination, an endless rail with straight portions and curved portions of a particular shape, an endless track encircling the rail and being composed of links, link pins pivotally connecting the links together, the link pin centers defining an imaginary line having straight portions lying tangent to perfect circle portions, and rollers secured to the links, a line from each roller axis to the adjacent link pin forming an acute angle with a line extending through the link pin centers, said rollers having their axes disposed inside the imaginary line and riding on the endless rail, the curved and straight rail portions causing the rollers contacting therewith to continually maintain the link pins in a path coinciding with the imaginary line.

6. In combination, an endless rail with parallel straight portions and curved portions of a particular shape, said rail being extensible in its straight portions for altering its overall length, an endless track encircling the rail and being composed of links, link pins pivotally connecting the links together, the link pin centers defining an imaginary line having parallel straight portions merging into perfect circle portions, and rail contacting rollers secured to the links and having their axes lying inside the imaginary line, the curved and straight rail portions causing the rollers contacting therewith to continually maintain the link pins in a path coinciding with the imaginary line, the extension of the parallel straight portions of the rail being designed to take up play in the endless track.

7. In combination, an endless rail with straight portions and curved portions of a particular shape, an endless track encircling the rail and being composed of links, link pins pivotally connecting the links together, the link pin centers defining an imaginary line having straight portions lying tangent to perfect circle portions, rail contacting rollers secured to the links and having their axes lying inside the line, the curved and straight rail portions causing the rollers contacting therewith to continually maintain the link pins in a path coinciding with the imaginary line, a drive sprocket disposed at one of the curved rail portions and having pin-receiving recesses, and sprocket-engaging pins carried by the links and disposed equidistant between the link pins, said sprocket pins lying on or inside the imaginary line formed by the link pins.

8. In combination, an endless rail with straight and curved portions, an endless track encircling the rail and composed of links pivotally connected together by link pins, the link pin centers defining a pitch line having straight and perfect circle portions, the straight portions lying tangent to the portions of perfect circles, rollers carried by the links and having their axes disposed inside the pitch line and riding on the rail, the straight and curved rail portions causing the rollers contacting therewith to move the pins in a path coinciding with the pitch line, sprocket pins carried by the links, and a drive sprocket disposed at one of the rail curved portions and having recesses for receiving the sprocket pins, the sprocket pins after entering the recesses remaining in a fixed position with respect to the sprocket until they leave the recesses.

9. In combination, an endless rail with curved portions of a particular shape, an endless track encircling the rail and being composed of links, link pins pivotally connecting the links together and defining an imaginary line with perfect circle portions and other portions interconnecting the perfect circle portions and lying tangent therewith, rollers mounted on the links and riding on the rail the axes of the rollers lying inside the imaginary line, said rollers causing the links to coordinate and move the link pins along a path coinciding with the imaginary line.

10. In combination, an endless track composed of links, pins pivotally connecting the links together, means for causing the pins to follow an endless line consisting of two straight parallel portions and perfect circle portions lying tangent to the ends of the straight portions, said means comprising an endless rail having two straight parallel portions and curved portions, rollers carried by the links and having their centers lying inside of the endless line, said rollers riding on the rail, the shape of the rail being such as to cause the rollers and the coordinated action of the links to move the link pins continuously along the endless line, and a sprocket disposed at one of the perfect circle portions for driving the endless track by engaging with the link pins.

11. In combination, an endless track composed of links, pins pivotally connecting the links together, means for causing the pins to follow an endless line consisting of two straight parallel portions and perfect circle portions lying tangent to the ends of the straight portions, said means comprising an endless rail having two straight parallel portions and curved portions, rollers carried by the links and having their centers lying inside of the endless line, said rollers riding on the rail, the shape of the rail being such as to cause the rollers and the coordinated action of the links to move the link pins continuously along the endless line, sprocket pins carried by the links and being disposed equidistant between the link pins, and a sprocket disposed at one of the perfect circle portions for driving the endless track by engaging with the sprocket pins.

12. In combination, an endless track composed of links, pins pivotally connecting the links together, means for causing the pins to follow an endless line consisting of straight portions and curved portions lying tangent to the straight portions, at least one of the curved portions being a perfect circle portion and at least two of the straight portions being parallel to each other, said means comprising an endless rail having at least two parallel straight portions, and curved portions, rollers carried by the links and having their centers lying inside of the endless line, said rollers riding on the rail, the shape of the rail being such as to cause the rollers and the coordinated action of the links to move the link pins continuously along the endless path defined by the straight and curved portions, a sprocket disposed in the perfect circle portion and engaging with the track, and a spreader placed in the parallel straight portions of the rail for taking up slack in the track for altering its overall length without changing the direction of the link pin travel.

13. In combination, an endless track composed of links, pins pivotally connecting the links together, means for causing the pins to follow an endless line consisting of straight portions and curved portions lying tangent to the straight portions, at least one of the curved portions being a perfect circle portion and at least two of the straight portions being parallel to each other, said means comprising an endless rail having at least two parallel straight portions, and curved portions, rollers carried by the links and having their centers lying inside of the endless line, said rollers riding on the rail and being disposed equidistant between the link pins, the shape of the rail being such as to cause the rollers and the coordinated action of the links to move the link pins continuously along the endless path defined by the straight and curved portions, a sprocket disposed in the perfect circle portion and engaging with the track, and a spreader placed in the parallel straight portions of the rail for taking up slack in the track for altering its overall length without changing the direction of the link pin travel.

14. In combination, an endless rail with parallel straight portions and curved portions of a particular shape, said rail being extensible in its straight portions for altering its overall length, an endless track encircling the rail and being composed of links, link pins pivotally connecting the links together, the link pin centers defining an imaginary line having straight parallel portions lying tangent to perfect circle portions, and rail contacting rollers secured to the links and having their axes lying inside the imaginary line, the curved and straight rail portions causing the rollers contacting therewith to continually maintain the link pins in a path coinciding with the imaginary line, the extension of the parallel straight portions of the rail being designed to take up play in the endless track without changing the direction of the link pin travel.

15. In combination, an endless track composed of links, pins pivotally connecting the links together, means for causing the pins to follow an endless line consisting of perfect circle portions and other portions interconnecting the perfect circle portions and lying tangent therewith, said means comprising a rail having a portion parallel to one of said other portions of said line and said rail having curved portions, rollers carried by the links and having their centers lying inside of the endless line, said rollers riding on the rail, and the shape of the rail being such as to cause the rollers and the coordinated action of the links to move the link pins continuously along the endless line.

16. In combination, an endless track composed of links, pins pivotally connecting the links together, means for causing the pins to follow an endless line consisting of perfect circle portions and other portions interconnecting the perfect circle portions and lying tangent therewith, said means comprising a rail having a portion parallel to one of said other portions of said line and said rail having a curved portion of a particular shape lying generally radially inwardly from a point of tangency of a perfect circle portion with one of said other portions of said endless line, rollers carried by the links and having their centers lying inside of the endless line, said rollers riding on the rail, a sprocket disposed at one of the perfect circle portions for driving the endless track by engaging with the links, and the shape of the rail being coordinated with the sprocket and such as to cause the rollers and the coordinated action of the links and sprocket to move the link pins continuously along the endless line.

17. In combination, an endless track composed of links, pins pivotally connecting the links together, means for causing the pins to follow an endless line consisting of portions curved generally around a center and other portions interconnecting the curved portions and lying tangent therewith, said means comprising a rail having a portion parallel to one of said other portions of said line and said rail having curved portions, rollers carried one by each link and having their centers lying inside of the endless line, said rollers riding on the rail, and the shape of the rail being such as to cause the rollers and the coordinated action of the links to move the link pins continuously along the endless line.

HARRY LAW.